United States Patent
Raimundo Filho

(10) Patent No.: US 9,587,285 B2
(45) Date of Patent: Mar. 7, 2017

(54) METHOD AND COMPOSITION FOR REDUCING THE COLOR OF SUGAR

(76) Inventor: José Raimundo Filho, Cachoeirinha (BR)

( * ) Notice: Subject to any disclaimer, the term of this patent is extended or adjusted under 35 U.S.C. 154(b) by 0 days.

(21) Appl. No.: 13/816,283

(22) PCT Filed: Aug. 12, 2011

(86) PCT No.: PCT/BR2011/000280
§ 371 (c)(1),
(2), (4) Date: May 24, 2013

(87) PCT Pub. No.: WO2012/019266
PCT Pub. Date: Feb. 16, 2012

(65) Prior Publication Data
US 2013/0239953 A1    Sep. 19, 2013

Related U.S. Application Data

(60) Provisional application No. 61/373,537, filed on Aug. 13, 2010.

(51) Int. Cl.
| | | |
|---|---|---|
| C13B 50/00 | (2011.01) | |
| A23L 1/277 | (2006.01) | |
| C13B 20/00 | (2011.01) | |
| C13B 20/08 | (2011.01) | |
| C13B 20/10 | (2011.01) | |

(52) U.S. Cl.
CPC ............... *C13B 50/00* (2013.01); *A23L 5/49* (2016.08); *C13B 20/005* (2013.01); *C13B 20/08* (2013.01); *C13B 20/10* (2013.01)

(58) Field of Classification Search
CPC ....................................................... C13B 20/00
See application file for complete search history.

(56) References Cited

U.S. PATENT DOCUMENTS

| | | | |
|---|---|---|---|
| 2,421,380 A * | 6/1947 | Isbell | ............................. 127/63 |
| 3,873,694 A | 3/1975 | Kanig | |
| 2006/0130984 A1 | 6/2006 | Neumann et al. | |
| 2006/0229393 A1 | 10/2006 | Duggirala et al. | |
| 2006/0273038 A1 | 12/2006 | Syed et al. | |

FOREIGN PATENT DOCUMENTS

| | | |
|---|---|---|
| CN | 1993517 A | 7/2007 |
| EP | 1788099 A2 | 5/2007 |

(Continued)

OTHER PUBLICATIONS

International Search Report mailed Nov. 22, 2011, which issued in corresponding International Application No. PCT/BR2011/000280.

(Continued)

*Primary Examiner* — Melvin C Mayes
*Assistant Examiner* — Douglas B Call
(74) *Attorney, Agent, or Firm* — Fish & Richardson P.C.

(57) ABSTRACT

This invention refers to a method for reducing the color of any intermediate of a process for obtaining sugar, and sugar and a process for the production of low color sugar. This invention also refers to the use of components and combinations thereof for reducing the color of sugar and/or any intermediate of a process for obtaining sugar.

5 Claims, 5 Drawing Sheets

(56) References Cited

FOREIGN PATENT DOCUMENTS

| EP | 1788100 A2 | 5/2007 | |
|---|---|---|---|
| EP | 1808428 B1 | 12/2010 | |
| GB | 174027 * | 1/1921 | |
| MX | 2007016295 A | 6/2009 | |
| WO | 200052473 A2 | 9/2000 | |
| WO | WO0221936 A3 | 6/2002 | |
| WO | WO 2009/066316 * | 5/2009 | ................ C13F 1/00 |
| WO | WO2009066316 A1 | 5/2009 | |

OTHER PUBLICATIONS

Office Action which issued Jan. 8, 2014 in Chinese Application No. 201180048984.5, with English translation.

* cited by examiner

METHOD AND COMPOSITION FOR REDUCING THE COLOR OF SUGAR

CROSS REFERENCE TO PRIOR APPLICATIONS

This is a U.S. National Phase application under 35 U.S.C. §371 of International Patent Application No. PCT/BR2011/000280, filed Feb. 16, 2012, and claims the benefit of U.S. Provisional Patent Application No. 61/373,537, filed Aug. 13, 2010 both of which are incorporated by reference herein in their entirety. The International Application published in English on Feb. 16, 2012 as WO 2012/019266 under PCT Article 21(2).

FIELD OF THE INVENTION

This invention refers to a method for reducing the color of any intermediate of a process for obtaining sugar, and sugar and a process for the production of low color sugar.

This invention also refers to the use of components and combinations thereof for reducing the color of sugar and/or any intermediate of a process for obtaining sugar.

BACKGROUND OF THE INVENTION

Sugar may be produced from a variety of raw materials such as sugar-cane, sugar-beets and saccharine sorghum, for example, which all present common problems with color reduction.

In sugar production processes based on sugar-cane, the cane is crushed, with the raw juice resulting from the crushing stage being treated by the following stages: heating, sulfitation, liming, phosphatation and decantation, among others. The purpose of these stages is to reduce the color of the juice and also eliminate insoluble substances.

Next, the juice is concentrated in one or more evaporators. The resulting syrup is then boiled and allowed to crystallize in a crystallization pan and centrifuged, thus producing sugar.

As is well known by a person skilled in the art, the efficiency of the sugar production process and color removal depends greatly on the quality of the crushed cane. In turn, sugar cane quality varies according to climate conditions, soil types, sugar cane varieties, maturity levels, length of time between burning, harvesting and crushing, loading techniques, transportation and the operating conditions of the sugar mill.

A factor that directly affects sugar quality is color. Thus, during production, it is important to remove color, turbidity and solids in suspension in order to produce pale, high grade sugar. The quality of the sugar cane and its variations, depending on the characteristics mentioned above, may result in darker coloring that must be removed.

Under any conditions, sugar cane has a variety of natural pigments that gives color to the sugar produced, such as flavonoids, which are soluble and pass through the traditional process without being removed.

The amount of colored matter in sugar-cane juice is very low in terms of percentages, making only around 3% of non-sugar organic compounds in the juice. However, these compounds become more important due to their pronounced effect on the coloring of the juice and the end product: sugar.

As mentioned above, sugar production processes comprise several stages focused on color reduction, such as the heating stage, which helps with decolorization in three ways simultaneously: (a) when heating the juice resulting from the crushing process, undesirable micro-organisms are eliminated from the process and the juices consequently are sterilized; (b) during the juice color reduction stage (in the decanter), when heating the juice above its boiling temperature, gases and bubbles are eliminated from the sugar cane juice, making the decanter operation more efficient; and (c) higher temperatures are needed for chemical reactions to occur during processes, such as sulfitation, which is a stage also related to color reduction.

During the sulfitation stage, sulfur dioxide ($SO_2$) acts on the juice by means of oxidation, reducing its color through a reaction that prevents darkening between the reduction sugars and amino acids.

The liming stage (pH correction) is also intended to reduce the color as it reduces saccharose losses through inversion, sterilizing the juice and potentiating the effects of the polyelectrolytes to be dosed. The product most widely used as a pH correction technique is lime.

Decantation is the stage in the juice treatment process where color reduction is more visible. At this stage, color reduction occurs through mechanical actions, with the juice becoming paler through removal of insoluble compounds in a decanter. In order for this concentration of insolubles to occur, in addition to the liming stage, it is necessary to introduce polyelectrolytes, generally at the input point of the decanter, which neutralize the electrostatic repulsion forces among the particles, thus ensuring coagulation and flocculation.

It is common to find sugar cane juices that are deficient in phosphate, reducing their decanting capacity. Thus, it is a common practice to introduce phosphoric acid, for example, as phosphate supplement. The calcium phosphate crystals are precipitated out along with colored bodies. This stage is known as phosphatation.

In addition to the stages mentioned above, depending on the quality of the sugar to be produced, other stages may also be added to the process in order to reduce the color, such as syrup flotation, magma remixing and refining.

Syrup flotation reduces the color and turbidity, by removing insoluble solids from the syrup that are suspended on the surface of the mixture, which are removed through mechanical means.

At the magma remixing stage, the magma is recycled back through continuous centrifuges, removing more mother liquors. It must be noted that the mother liquor is the darkest compound with the lowest purity in the process.

It is worthwhile stressing that syrup flotation and magma remixing are processes that, in addition to requiring the installation of new equipment, outlays on input materials, heat energy and electricity, also reduce the recovery of sugar in the mill.

The refining stage is used to obtain refined and/or paler sugar, basically encompassing three operations: (a) dissolving the sugar to obtain liquor, and heating, (b) flotation of the liquor in a clarifier, with removal of undesirable materials from the surface, and (c) recrystallization. Color reduction occurs during the liquor flotation stage, which works on the same concept as syrup flotation as described above.

The high chemical, energy and equipment cost of the refining stage substantially affects the sugar processing efficiency and profitability.

As described above, all traditional processes and known techniques for removing colored impurities during sugar production use physical means (such as decantation, heating and centrifuging) to reduce color of the sugar produced. The few chemical processes used, such as sulfitation and phosphatation, for example, may result in mass losses during the sugar production process.

Furthermore, the chemical and physical processes which are part of the state of the art are not efficient. Traditional sugar mills are unable to easily produce crystal sugar with 150 UI (ICUMSA units) of color as established by the International Commission for Uniform Methods of Sugar Analysis through the processes for reducing color described above. The sugar produced by these mills, known as Very High Polarization (VHP) sugar has up to 1000 UI. It must be stressed that even if low color sugar is achieved during production, the color of the sugar crystals increases over time.

It must also be considered that all the difficulties mentioned above may become even more significant, depending on the sugarcane variety, which is one of the factors with the strongest influence in the color reduction process. There are some varieties of cane, such as RB92579, that are highly productive but result in highly colored syrup. This color cannot be efficiently reduced through the existing processes described above.

Consequently, there is a need for sugar color reduction methods in sugar production processes whose output is stable, which might even shorten some stages of the process, and which are economically feasible.

BRIEF DESCRIPTION OF THE INVENTION

This invention includes a method for reducing the color of sugar and/or any intermediate of a process for obtaining sugar, and includes the sugar made with this method, characterized by the fact that the method comprises the addition of at least Component 3 and Component 1 and/or 2, wherein the Components are:

Component 1: at least one of an inhibitor of enzymes that catalyze the formation of color bodies or precursors to color bodies, a compound which reacts with anthocyanins to decolorize the anthocyanins, or a compound which inhibits the formation of reactions of peroxidase (POD) and/or polyphenol-oxidase (PPO) enzymes;

Component 2: one or more of sulfites, metabisulfites, bisulfites, hydrosulfites, or sulfur dioxide or a source thereof; and Component 3: at least one chelating agent.

This invention also includes a process for the production of low color sugar and/or any intermediate of a process for obtaining sugar, and includes the sugar made with this process, characterized by the fact that it comprises the addition, at stages of the process, of at least Component 3 and Component 1 and/or 2, as follows:

Component 1: at least one of an inhibitor of enzymes that catalyze the formation of color bodies or precursors to color bodies, a compound which reacts with anthocyanins to decolorize the anthocyanins, or a compound which inhibits the formation of reactions of peroxidase (POD) and/or polyphenol-oxidase (PPO) enzymes;

Component 2: one or more of sulfites, metabisulfites, bisulfites, hydrosulfites, or sulfur dioxide or a source thereof; and Component 3: at least one chelating agent.

This invention includes a composition for reducing the color of sugar, and includes the sugar treated with this composition, characterized by the fact that the composition comprises at least Component 3 and Component 1 and/or 2 mentioned above.

This invention also includes a kit, characterized by the fact that it comprises at least two of the Components 1, 2 and 3 mentioned above, in the same or different compartments.

This invention also refers to the use of the three Components of the present invention, as well as the use of Component 3 in combination with Component 1 or Component 2 for reducing the color of sugar and/or any intermediate of a process for obtaining sugar.

DEFINITIONS

As used in the present invention, the term "raw juice" represents the liquid obtained by grinding the sugar cane.

The term "decanted juice" refers to juice that has already run through a decantation stage.

The term "syrup" represents the liquid obtained after evaporating the juice to at least some degree.

The term "rich mother liquor" indicates the mixture resulting from washing the sugar mass during the centrifuging process.

The term "poor mother liquor" indicates the mixture that is expelled during the sugar centrifuging stage through centripetal force.

The term "liquor" indicates sugar dissolved in water during the refining process.

The term "magma" means a saturated sugar paste used as sugar crystals for crystallization.

The term "molasses" refers to the final mother liquor, which comes from the centrifugation of a mass of sugar comprised of syrup, mother liquor and sugar crystals, with low saccharose content comparatively with the other mother liquors, which make its utilization in the process unviable.

The term "raw sugar" refers to sugar that has already been subjected to centrifuging or similar processing, even if further processing is conducted.

The term "refined sugar" refers to raw sugar which has subsequently been refined.

The term "mother liquor" is the liquid in which crystallized sugar is contained.

The term "intermediate of a process for obtaining sugar" includes all the terms described above and any other product that may be obtained during a process for obtaining sugar.

The term "sugar" shall encompass both raw sugar and refined sugar unless indicated otherwise.

DETAILED DESCRIPTION OF THE INVENTION

All ranges disclosed in this disclosure are deemed to provide support for any sub-ranges within those ranges and any points within those ranges.

All sugar test data presented in this application was conducted with cane raw sugar, unless indicated otherwise.

The method according to the present invention allows the reduction of the color of syrup or any intermediate of a process for obtaining sugar during sugar processing and the final raw sugar produced, as well as during the refining of sugar or any other additional step after obtaining the raw sugar, through the addition of at least Component 3 and Component 1 and/or 2.

Figure 4:
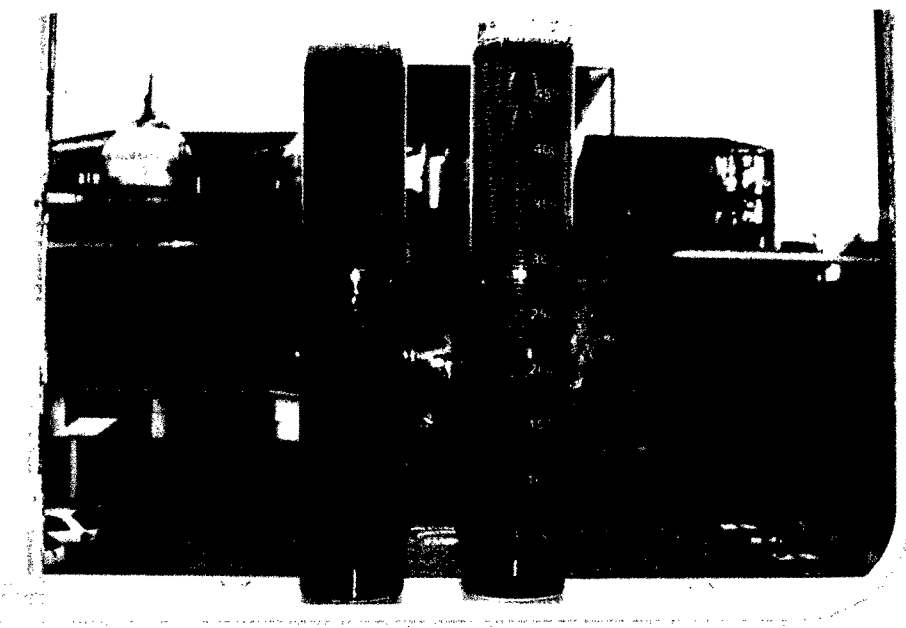
FIG. 4 shows the application of the technology of the present invention on beet juice.

The raw material for sugar production is preferably but not limited to sugar cane (*Saccharum* spp) in many different varieties, such as RB92579, SP791011, RB001914, RB001915, RB98710, RB951541, RB001921, VAT90212, RB991536, RB011518, RB99395, RB011541, RB011549, RB011585, RB011514, RB011553, RB863129, RB971723, RB845210, RB845210, RB813804 and SP813250, for example. Any other source known in the art for sugar production may also be used, such as sugar-beets (*Beta* ssp) and saccharine sorghum (*Sorghum bicolor*), for example, as can be seen in FIG. 4, which shows the use of the technology of the present invention in beet juice and demonstrate the reduction of color. The technology of the present invention applies to sugar cane varieties that, as mentioned, are highly productive but present problems with lowering the color of the juice, such as the RB92579 cane, as well as sugar-cane varieties that do not present problems with lowering the color, such as SP1011.

The present invention also comprises the use of the three Components of the present invention, as well as the use of Component 3 with Component 1 or 2 for reducing the color of sugar and/or any intermediate of a process for obtaining sugar.

The Components act chemically in order to reduce the color and thus allow the production of syrup, raw sugar, and refined sugar.

Causes of Color

There are various components in sugar cane that endow the juice with color, including flavonoids. A group of flavonoids that is important for coloring is the anthocyanins:

FORMULA I

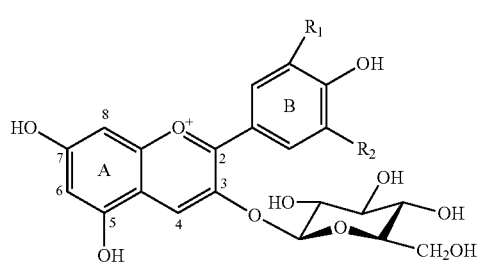

The anthocyanins (Formula I) are one of the main causes of color in sugar production. Not only are the anthocyanin molecules colored, but they may also be subject to polymerization reactions triggered by polyphenol-oxidase (PPO) and peroxidase (POD) enzymes that generate for example, melanin and several polyphenol compounds that are strongly colored.

In addition to the anthocyanins, one of the causes of coloring during the sugar production processes is related to "impurities" in the sugar, in terms of the current technology, such as glucose, which may be subject to chemical reactions resulting in hydroxymethylfurfural (HMF). The polymerization of HMF generates, for example, melanoidin which is a strongly colored compound.

The Components added, as well as the principles involved in the present invention, will be explained in greater detail below.

Component 1

Component 1 can be an inhibitor of enzymes that catalyze the formation of color bodies or precursors to color bodies during sugar and/or any intermediate processing, such as a PPO and/or POD inhibitor. Component 1 can also be an inhibitor of polyphenol polymerization, such as an inhibitor of anthocyanin polymerization. Examples of Component 1 include sulfoxylates, such as sodium formaldehyde sulfoxylate (CAS No 149-44-00), and potassium formaldehyde sulfoxylate, and sodium hydrosulfite (CAS No 7775-14-6). Component 1 can be a salt of the form $M^{+-}O-S(=O)-CH(OH)R$, or a monobasic organic acid of sulfur having the general formula $RSO_2H$. $M^+$ can be mono and multivalent cations, including sodium, potassium, lithium, calcium, magnesium, barium, aluminum, iron, and zinc. $R=H$, $C_1$-$C_{20}$ alkyl, branched $C_1$-$C_{20}$ alkyl, cyclic $C_5$-$C_6$ alkyl, aryl, benzyl, and heterocyclic $C_5$-$C_6$ rings, and can be substituted or unsubstituted.

A preferred Compound 1 of $M^{+-}O-S(=O)-CH(OH)R$ is when $M^+=Na$ and $R=H$, which is sodium formaldehyde sulfoxylate. All test data in the application was obtained using sodium formaldehyde sulfoxylate unless stated otherwise.

Component 1 can also include potassium metabisulfite, sodium chlorite, tropolone, cysteine, beta-fluorocaffeic acid, and ascorbic acid. Component 1 can be a mix of one or more of the compounds disclosed herein for Component 1.

Not all the compounds in the sulfoxylate class are equally effective, however. For example, sodium hydrosulfite does not provide the same stability of color as sodium formaldehyde sulfoxylate. A test was conducted on raw juice decanted in the lab with polymers, lime, and phosphoric acid. The sample was tested with and without Components 1-3. The results of the test are in Table 1 below. In this example, the chemicals used were 100 ppm of sodium formaldehyde sulfoxylate, 100 ppm of sodium metabisulfite (Component 2), and 360 ppm of HEDP (Component 3), and 100 ppm of sodium hydrosulfite, were indicated.

TABLE 1

| Sample | Initial Color (IU) | Color After 1 hour (IU) | Color After 2 hours (IU) |
|---|---|---|---|
| Untreated | 12,210 | 12,615 | 12,950 |
| Treated with sodium formaldehyde sulfoxylate | 11,123 | 11,004 | 11,119 |
| Treated with sodium hydrosulfite | 11,776 | 12,941 | 13,098 |
| Treated with sodium formaldehyde sulfoxylate and Components 2 and 3. | 8,303 | 8,529 | 8,724 |
| Treated with sodium hydrosulfite and Components 2 and 3. | 8,643 | 9,073 | 9,663 |

As can be seen, the performance of sodium formaldehyde sulfoxylate was better in both reducing color and maintaining color. In fact, the test where only sodium hydrosulfite was added, the color reversion resulted in more color than the untreated sample. Thus, the use of sodium hydrosulfite (CAS No 7775-14-6) provided improvement when combined with Components 2 and 3, but was not as effective as sodium formaldehyde sulfoxylate.

Sodium formaldehyde sulfoxylate is a powerful reducing agent, which works through inhibiting the polymerization of the anthocyanins that generate strongly colored polyphenols. Furthermore, the addition of sulfoxylate groups to the anthocyanins in Positions 2 and 4, as presented in Formula I, results in the formation of colorless sulfonic structures.

Component 1 reduces iron(III)-ions, inhibiting the formation of complex reactions of POD, which would oxidize phenolics to quinones that exhibit deep intense green and brown to black colors. In addition, it is believed that Component 1 also reduces the iron compounds found in sugar cane juice systems, thus blocking the carbonyl function of the amino acids and consequently lessening caramelization reactions. These caramelization reactions are polymerization reactions that also generate colored products.

Additionally, Component 1 helps disintegration of starch molecules through breaking down of starch 1→4 bonds into smaller units, which lessens the viscosity of the medium in which it is applied, fostering crystallization. The viscosity reduction is maintained through subsequent stages, resulting in lower color. The reduction of size of starch molecules and associated viscosity reduction results in lower color by improving crystallization in the boiling pans and improving the performance of the sugar centrifuges which separate the sugar from the mother liquors at the end of the process, in order to purify the sugar and lower its color.

Furthermore, by reducing the size of the starch molecules, this consequently lessens the turbidity of the liquid, thus lowering the color.

Component 2

Component 2 is selected among sulfites, including metabisulfites, bisulfites, sulfites, and hydrosulfites, such as the following compounds: sodium metabisulfite ($Na_2S_2O_5$) (CAS No 7681-57-4), potassium metabisulfite ($K_2S_2O_5$) (CAS No 16731-55-8), calcium metabisulfite ($CaS_2O_5$), magnesium metabisulfite ($MgS_2O_5$), sodium bisulfite ($NaHSO_3$) (CAS No 7631-90-5), potassium bisulfite ($KHSO_3$) (CAS No 7646-93-7), calcium bisulfite ($Ca(HSO_3)_2$), magnesium bisulfite ($Mg(HSO_3)_2$), sodium sulfite ($Na_2SO_3$) (CAS No 7757-83-7), potassium sulfite ($K_2SO_3$) (CAS No 10117-38-1), ammonium sulfite ($(NH_4)_2SO_3$ (CAS No 10196-04-0), magnesium sulfite ($MgSO_3$) (CAS No 7757-88-2), calcium sulfite ($CaSO_3$) (CAS No 10257-55-3), and sodium hydrosulfite ($Na_2S_2O_4$), or mixtures thereof. Sulfur dioxide can be used as well. Sulfur dioxide can be introduced in the form of sulfur or other sulfur dioxide sources, which may include some or all of the above-identified components.

For sugar production, Component 2 preferably includes sodium metabisulfite. All of the examples in the present application were conducted with sodium metabisulfite as Component 2.

Component 2 acts by blocking the carbonyl group of hexoses, and consequently reducing HMF formation. This Component is an auxiliary reducing compound that also helps inhibit the action of the PPO and POD enzymes.

At high temperatures and low pH, Component 2 may be a source of $SO_2$ even if it is not $SO_2$. In the present invention, preferably, the temperature at which Component 2 is utilized is at less than 150° C., or less than 105° C., even less than 90° C., or around 65° C. to manage the formation of $SO_2$.

The pH is preferably higher than 3, such as 4-8, and preferably 6-7, to also manage the formation of $SO_2$. While $SO_2$ can be used in the present invention, other compounds, such as sodium metabisulfite, are superior and therefore are better if not converted into $SO_2$. For example, since Component 2 is added as a liquid (Component 2 is a solid which is then dissolved in a solvent), it can be pumped to the juice or syrup. If it converts to $SO_2$ quickly, $SO_2$ is a gas and would exit the solution quickly without having as much of an effect. Additionally, Component 2 will react with glucose carbonyls to form sodium hydroxylsulphonate, which is a stable substance. This reaction precludes the formation of hydroxymethylfurfural (HMF). Otherwise, the HMF would lead to the formation of melanoidin, which is a dark brown substance. While $SO_2$ may also block carbonyl groups, such reaction is not as stable and some reversion to sulfur dioxide will occur. The use of sodium metabisulfite and others leads to more stable compounds and less reversion, if any.

Similar to Component 1, Component 2 also helps reduce the size of the starch molecules, resulting in the same improvements as mentioned above.

The use of Component 2 helps reduce or even eliminate the amount of $SO_2$ needed during sulphitation, depending on the final color requirements for the sugar. Typically, 300-500 grams of sulfur are added during sulphitation per ton of crushed cane. When the present invention is utilized, the amount of sulfur can be reduced to 150-220 grams of sulfur per ton of crushed cane. With the use of sulfur, the amount of $SO_2$ normally generated is 200-330 grams of $SO_2$ per ton of crushed cane during sulphitation, and the use of the present invention can be combined with the generation of only 100-145 grams of $SO_2$ per ton of crushed cane.

Component 3

Component 3 is a powerful chelating agent that can form complexes with metals, including copper and iron, which are essential components of the PPO and POD enzymes, respectively, hence inhibiting the action of these enzymes. This Component is selected among any compound classified among the chelating agents.

Preferably, Component 3 is selected among chelating agents from the phosphonate family and the carboxylic acid family, and can also be part of the organic phosphoric acid family, and can be an aminopolycarboxylic acid, an amine, a polyamine, a hydroxycarboxylic acid, a hydroxylamine, a polyol, a salicylic derivative, acetyl acetonates, Iron (II) compounds, oxines, and natural compounds. It can also be citric acid or its salts or ascorbic acid or its salts, or an EDTA salt. Some examples of Component 3 include aminopolycarboxylic acid and salts thereof, a hydroxycarboxylic acid and salts thereof, 2-aminoethylphosphonic acid (AEPN) and salts thereof such as sodium 2-aminoethylphosphonate (AEPN-Na), dimethyl methylphosphonic acid (DMMP) and salts thereof including sodium dimethyl methylphosphonate (DMMP-Na), 1-hydroxy ethylidene-1,1-diphosphonic acid (HEDP) and salts thereof such as monosodium, bisodium, or tetrasodium 1-hydroxy ethylidene-1,1-diphosphonate (HEDP-Na, HEDP-Na2, and HEDP-Na4), amino tris(methylene phosphonic acid) (ATMP) and salts thereof such as trisodium amino tris(methylene phosphonate)(ATMP-Na3), ethylenediamine tetra(methylene phosphonic acid) (EDTMP) and salts thereof such as tetrasodium ethylenediamine tetra(methylene phosphonate) (EDTMP-Na4), tetramethylenediamine tetra(methylene phosphonic acid) (TDTMP) and salts thief such as tetrasodium tetramethylenediamine tetra(methylene phosphonate)(TDTMP-Na4), hexamethylenediamine tetra(methylene phosphonic acid) (HDTMP) and salts thereof such as tetrasodium hexamethylenediamine tetra(methylene phosphonate)(TDTMP-Na4), diethylenetriamine penta(methylene phosphonic acid) (DTPMP) and salts thereof, phosphonobutane-tricarboxylic acid (PBTC) and salts thereof, N-(phosphonomethyl)iminodiacetic acid (PMIDA) and salts thereof such as sodium N-(phosphonomethyl)iminodiacetate (PMIDA-Na), 2-carboxyethyl phosphonic acid (CEPA) and salts thereof such as sodium 2-carboxyethyl phosphonate (CEPA-Na), 2-hydroxyphosphonocarboxylic acid (HPAA) and salts thereof such as sodium 2-hydroxyphosphonocarboxylate (HPAA-Na), amino-tris-(methylene-phosphonic acid (AMP) and salts thereof such as trisodium amino-tris-(methylene-phosphonate)(AMP-Na3), diethylenetriamine penta(methylene phosphonic acid) (DTMP) and salts thereof such as pentasodium diethylenetriamine penta(methylene phosphonate) (DTMP-Na5), aminotris(methylene phosphonic acid) (ATMP), and salts thereof such as trisodium aminotris (methylene phosphonate)(ATMP-Na3) EDTA or salt thereof, such as disodium ethylene diamine tetraacetic acid (EDTA.2Na), and tetrasodium ethylene diamine tetraacetic acid (EDTA.4Na); isopropenylphosphoric acid (IPPA) and salts thereof such as sodium isopropenylphosphonate (IPPA-Na); homo or co-polymers of isopropenylphosphoric acid, such as polyisopropenylisophosphoric acid (PIPPA) and salts thereof, co-polyacrylic acid-polyisopropenylisophosphoric acid and salts thereof; Nitrilotriacetic acid (NTA) and salts thereof such as sodium nitrilotriacetate (NTA-Na); (2-hydroxyethyl)ethylenediaminetriacetic acid (HEDTA) and salts thereof such as trisodium (2-hydroxyethyl)ethylenediaminetriacetate (HEDTA-Na3; propylenediaminotetraacetic acid (PDTA) and salts thereof such as tetrasodium propylenediamineotetraacetate (PDTA-Na4); diethylene-tri-aminopentacetic acid (DTPA) and salts thereof such as pentasodium diethylene-triaminopentacetate (DTPA-Na5); ethylene-diamino-di(o-hydroxyphenyl)-acetic acid (ED-DHA) and salts thereof such as disodium ethylene-diamino-di(o-hydroxyphenyl)-acetate (EDDHA-Na2); ethylene-di-amino-di(5-carboxy-2-hydroxyphenyl)-acetic acid (EDDCHA) and salts thereof such as disodium ethylene-diamino-di(5-carboxy-2-hydroxyphenyl)-acetate (EDDCHA-Na2); ethyldiamino-di(o-hydroxy p-methyl-phenyl)-acetic acid (EDDHMA) and salts thereof such as disodium ethyldiamino-di(o-hydroxy p-methyl-phenyl)-acetate (EDDHMA-Na2); Ethylenediamine (EDA); Diethylenetriamine (DETA); Triethylenetetramine (TETA); Tetraethylenepentamine (TEPA); Tartaric acid (At) and salts thereof; Citric acid (Cit) or salt thereof; ascorbic acid or salt thereof, Gluconic acid (Gluc) and salts thereof; Heptagluconic acid and salts thereof; Monoethanolamine (MEA); Diethanolamine (DEA); Triethanolamine (TEA); N-hydroxyethylethylenediamine (Hen); N-dihydroxyethylglycine (2-HxG); Sorbitol; Mannitol; Dulcitol; Salicylaldehyde; Salicylic acid and salts thereof such as sodium salicylate; 5-sulfosalicylic acid and salts thereof such as sodium 5-sulfosalicylate; Trifluoroacetylacetone (Tfa); Thenoyltrifluoracetone (TTA); Dipyridyl (Dipi); o-phenanthroline (Phen); Oxine; 8-hydroxyquinoline (Q; ox); Oxine-sulfonic acid; Lignosulfonates; Polyflavonoids; Humic substances; Algae extracts; Aminoacids and salts thereof; Pyroligneous extract; or mixtures thereof.

Preferably, Component 3 is selected among DTMP (diethylenetriamine (penta methylene phosphonic acid)), ATMP (aminotris(methylene phosphonic acid)), HEDP (1-hydroxy ethylidene-1,1 diphosphonic acid), EDTA.2Na (disodium ethylene diamine tetraacetic acid), EDTA.4Na (tetrasodium ethylene diamine tetraacetic acid); or mixtures thereof.

Component 3 may be used as a mixture of at least two chelating agents, or can comprise only one chelating agent. Preferably, Component 3 comprises HEDP. Component 3 can include any one or more of the compounds specified above, such as any one or more chelants.

This Component is added in order to avoid the reversal of color reduction, as a certain amount of color returns to the sugar through the actions of the PPO and POD enzymes, thus guaranteeing low color quality for the sugar. The Examples of the present application utilized HEDP as Component 3 unless specified otherwise.

Method

The method of the present invention is directed towards the color reduction of sugar and any intermediate of a process for obtaining sugar, through the addition of at least Component 3 and Component 1 and/or 2 described above.

It is important to stress that the method of the present invention is not limited to the raw sugar production process that will be presented in greater detail below, but may also be used at stages subsequent to raw sugar production, such as when to lighten sugar already produced at an earlier stage, such as previously produced raw sugar or refined sugar which color is to be subsequently reduced. For example, the Components can be added to the liquor obtained after raw sugar is dissolved in water during a refining operation. For clarity, such liquor (which is part of the refining process) is not the same as the VHP sugar liquor (which is part of the raw sugar processing process) or the "rich mother liquor" and "poor mother liquor", both of which pertain to the preparation of raw sugar, not refined sugar. In this application, the term "liquor" shall refer to that present during refining unless specified otherwise. Preferably, the Components will be added after the liquor is heated and before crystallization during the refining.

The present invention is also directed to sugar made with the method or process of the present invention using the Components. Such sugar may exhibit traces of Components 1, 2, and/or 3. For example, Component 1 may show traces of formaldehyde up to 500 parts per billion or even up to 1 part per million weight relative to weight of the sugar. Component 2 may be present in the form of sulfates, such as 100-2000 ppm (or any range within this range) of sulfates weight relative to the weight of the sugar. It should be noted that sulfitation during the clarification of sugar can also contribute to the total sulfates present. Component 3 may be present in the final sugar a range of about 2 ppm (weight of Component 3 relative to the weight of the sugar) to about 1500 ppm, although any sub-range within this 2 ppm-1500 ppm range is deemed to be supported by the present invention, including about 6 ppm to about 330 ppm, about 6 ppm to about 240 ppm, about 8 ppm to about 240 ppm, about 6 ppm to about 150 ppm, about 3 ppm to about 75 ppm, about 6 ppm to about 40 ppm, about 3 ppm to about 30 ppm, and about 20 ppm to about 40 ppm, and about 20 ppm to about 30 ppm. At Example 7 below, the amount of residual HEDP of the resulting sugar was, on average, the following: 60 ppm HEDP used (4.4 ppm residual HEDP), 90 ppm HEDP used (32.7 ppm residual HEDP), 120 ppm HEDP used (49.7 ppm residual HEDP), and 180 ppm HEDP used (66.8 ppm residual HEDP). Component 3 can be added to two or more different locations, or just one location.

Components 1, 2 and/or 3 may be added at any stage of a process for the reduction of the color of sugar and/or any intermediate of a process for obtaining sugar. This comprises the preparation of syrup, the preparation of raw sugar from syrup, and the refining of raw sugar into refined sugar, among others. Components 1, 2, and/or 3 are effective to reduce the color of the syrup, the raw sugar, and the refined sugar, for example, and can be added, not only, but preferably, during the preparation of the syrup, during the preparation of the raw sugar, and during the preparation of the refined sugar.

Process

Figure 1:
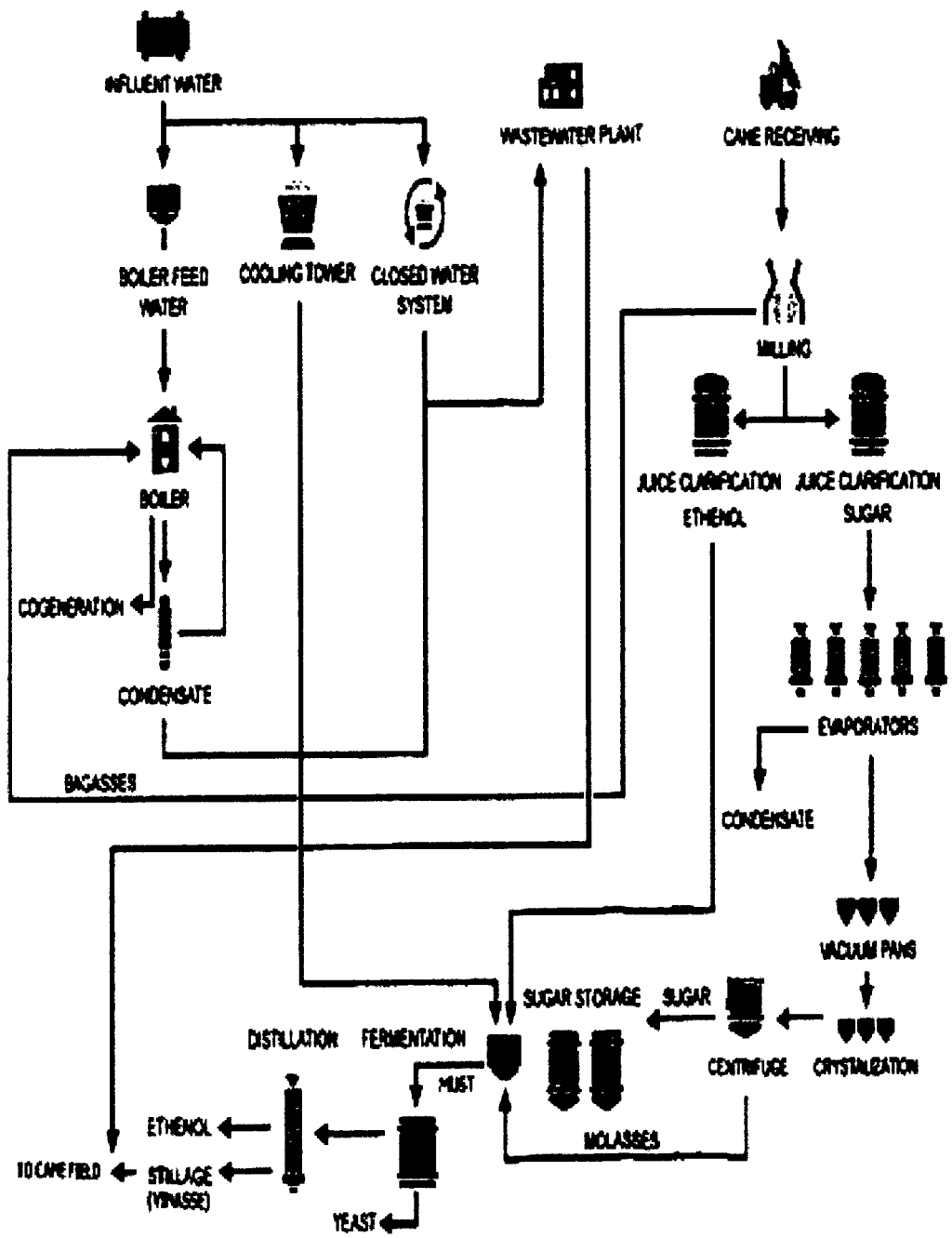
FIG. 1 presents a diagram of a sugar mill at a plant working with a traditional sugar production process.

FIG. 1 represents the overview of a sugar mill with a traditional sugar production process. This sugar mill uses a sugar production process based on sugar cane. However, the present invention is not limited to this raw material, and is applicable to processes of other raw materials, such as sugar-beets and saccharine sorghum or mixtures thereof.

The use of two or more of the Components in, for example, syrup or any intermediate of a process for obtaining sugar prepared from sugar cane, sugar-beets, or saccharine sorghum is envisioned by the present invention to produce a reduced color sugar.

The process of the present invention comprises the application of a set of input materials not used previously to reduce color of sugar and/or any intermediate of a process for obtaining sugar and enhance the quality of the final sugar produced, whether it is raw sugar or refined sugar. The technology of the present invention allows avoiding some additional sugar production stages, such as syrup flotation, for example, due to its ability to reduce color. Also, the present invention can reduce or eliminate the need for the use of $SO_2$ in a sulfitation stage.

The sugar production process of the present invention includes the addition of at least Component 3 and Component 1 and/or Component 2. Thus, mixtures of Components 1 and 3, 2 and 3, and 1, 2, and 3 will be utilized.

Component 3 and Component 1 and/or Component 2 can be added at any stage of the sugar production process.

Component 3 and Component 1 and/or Component 2 may be added to various points in the production of raw or refined sugar, including among others the following points: after grinding the cane, during or after heating, during or after sulfitation, during or after liming, during or after phosphatation, during or after decantation, during or after evaporation, during or after boiling, during or after centrifuging, during or after syrup flotation, during or after magma remixing, and during refining. In order to evaporate the juice (whether cane juice or otherwise), various numbers of evaporators may be used, with each evaporator constituting a stage of the process. The evaporators can be 1, 2, 3, 4, 5, or more evaporators connected in series. Preferably, at least two evaporators will be used, such as four evaporators.

Preferably, Component 3 and Component 1 and/or Component 2 are added at the input point of any of the evaporators, preferably the input point of the last evaporator, whereby the smallest possible quantities of the Components are added, in order to economize on chemical feedstock. In other words, the pipe which transmits the syrup to the last evaporator can be modified to receive Component 3 and Component 1 and/or Component 2. It is possible to add the Components directly to the evaporators, such as the last evaporator (as opposed to the syrup pipe leading to the last evaporator) but it is less expensive from an equipment standpoint to add them to the pipe which transmits the syrup. The components can also be added downstream of the last evaporator.

Figure 3:
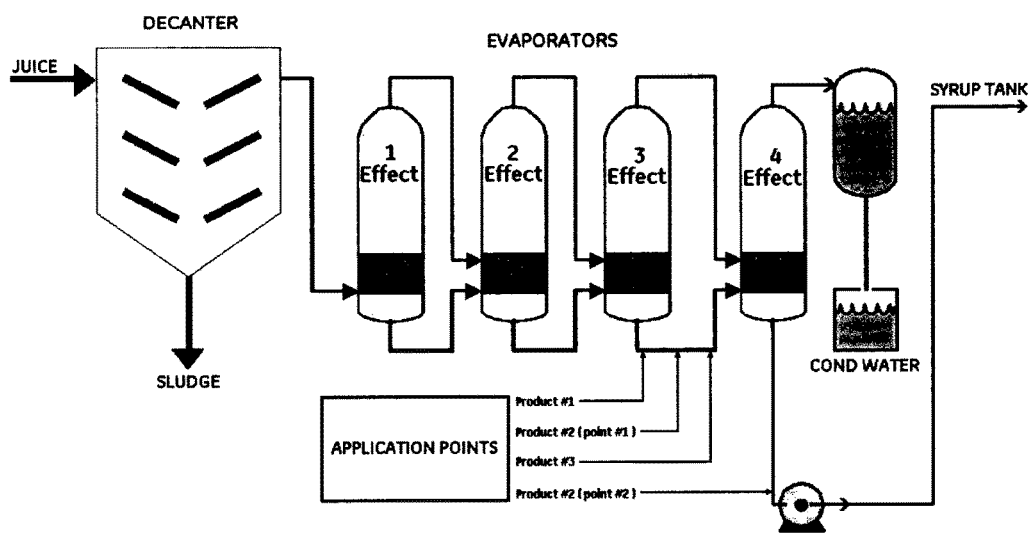
FIG. 3 shows, in an embodiment of the present invention, the locations for feeding Components 1-3 during sugar processing.

In an even more preferred embodiment, in addition to adding Components 1, 2 and 3 or Components 2 and 3 at the input point of the last evaporator (i.e., into the syrup which is being added to the last evaporator), Component 2 is optionally added a second time, preferably to the syrup exiting the last evaporator. FIG. 3 shows such a procedure. This is done since there may be some oxygen exposure after the first application of Component 2, and this additional exposure to Component 2 can result in less color.

This second addition of the Component 2 is also intended to ensure that any impurity that may remain in the sugar, depending especially on the conditions of the raw material used, do not result in a reversal of the color reduction of the sugar during storage.

Component 3 and Component 1 and/or Component 2 may be added to the process through different input points or feeder points or addition points or directly to the operating units of the process. For example, they may be added to juice entering the evaporator stages, or to the syrup being transported from evaporator to evaporator, or to the evaporators themselves.

In one embodiment, the three input points are located at different stages of the process. In another preferred embodiment, the input points are located at the same stage of the process. In yet another embodiment, the three Components are added to the process through a single input point as a mixture, or separately to the same point, or at different points of the process.

Optionally, two of the Components may be combined at the same input point, such as Components 1 and 2 being added through one input point, simultaneously, with Component 3 added separately, at the same input point or at a different input point.

Each Component may be added independently through more than one input point. Preferably, Component 2 may have two or more input points in the process. Also preferably, Component 3 may have two or more input points in the process.

In another preferred embodiment of the present invention, up to 50%, or preferably 20% of Component 3 may be added at one input point, and the rest at another input point. The ratio can be about 1:20 to about 20:1 and about 1:10 to about 10:1, and about 1:5 to about 5:1 between the different input points in ppm.

In an even more preferred manner, part of Component 3 is added at the input point of the first evaporator (i.e., into the syrup entering the first evaporator), and the remaining portion is added at the input point of the last evaporator (i.e., into the syrup entering the last evaporator). The addition can also be directly to the first and last evaporators, respectively.

This bifurcated addition of Component 3 may result in advantages arising from other properties of Component 3, such as the fact that it is an anti-scale agent. This addition helps clean the evaporators, thus reducing operating costs. Thus, the Component 3 being added before the first evaporator (i.e., to the decanted juice being sent to the first evaporator) or to the first evaporator can help reduce the scaling in the evaporators while also helping to reduce the color of the syrup produced.

The three Components may be added in any order during the process.

Components 1, 2 and 3; or Components 1 and 3; or Components 2 and 3, may be added to the process in sufficient quantities to reduce color. For example, the amount of Component 1 can be from about 5 ppm to about 5000 ppm, although any sub-range within this 5 ppm-5000 ppm range is deemed to be supported by the present invention, including about 10 ppm to about 1000 ppm, about 10 ppm to about 750 ppm, about 20 ppm to about 750 ppm, about 10 ppm to about 500 ppm, about 20 ppm to about 500 ppm, about 20 ppm to about 100 ppm, about 50 ppm to about 100 ppm, and about 25 ppm to about 75 ppm, and about 20-25 ppm. These ppm values are the values of Component 1 by weight relative to the volume into which Component 1 is being added on a milligram per liter basis. For example, 1 ppm of Component 1 being added to syrup or any intermediate of a process for obtaining sugar, would be 1 mg of Component 1 per liter of syrup or any intermediate of a process for obtaining sugar. Since the volume at different points in the process may vary, the same ppm values at different points in the process may result in different absolute amount of chemical used. This description of ppm (i.e., that each ppm is 1 mg of the Component per liter of liquid into which it is added) shall apply to all of the use of Components 1, 2, and 3 unless stated otherwise.

The disclosed amount of Component 1 above, and the amounts of Components 2 and 3 below, can be added to a process for raw sugar production or to a process that takes raw sugar and processes such sugar (such as by refining) into refined sugar with less color. If added during refining, the Components would be added to the liquor which results from the dissolution of the sugar, and the ppm would be relative to the volume of the liquor. This will reduce the color of the liquor, which will result in lighter sugar upon recrystallization of the liquor.

The amount of Component 2 can be about 5 ppm to 5000 ppm, although any sub-range within this 5 ppm-5000 ppm range is deemed to be supported by the present invention, including about 20 ppm to about 1500 ppm, about 20 ppm to about 1000 ppm, bout 20 ppm to about 750 ppm, about 20 ppm to about 500 ppm, about 50 ppm to about 500 ppm, about 50 ppm to about 200 ppm, about 50 ppm to about 150 ppm, about 50 ppm to about 100 ppm, about 40 ppm to about 50 ppm, and about 25 ppm to about 75 ppm. Component 2 can be added into one location or it can be added into two or more locations in the ppm amounts disclosed above in each location. Preferably, the addition into the two different locations are about the same in terms of ppm, although the ratio can be about 1:20 to about 20:1, such as 1:10 to 10:1 or 1:5 to 5:1 in terms of ppm. The preferred location for addition for Component 2 is both before and after the last evaporator. It has been found that this improves the color of the syrup and sugar produced.

The amount of Component 3 can be from about 5 ppm to about 5000 ppm, although any sub-range within this 5 ppm-5000 ppm range is deemed to be supported by the present invention, including about 20 ppm to about 1000 ppm, about 20 ppm to about 720 ppm, about 25 ppm to about 720 ppm, about 20 ppm to about 500 ppm, about 60 ppm to about 360 ppm, about 60 ppm to about 180 ppm, about 20 ppm to about 120 ppm, about 60 ppm to about 120 ppm, about 50 to about 100 ppm, and about 50-90 ppm. Component 3 can be added to two or more different locations, or just one location.

Composition

The present invention is also directed to a composition comprising Components 1 and 2. This composition can then be added to the sugar processing in conjunction with Component 3 to reduce the color of sugar and/or any intermediate of a process for obtaining sugar. In other words, when Components 1-3 are applied in one point, it is possible to apply Components 1 and 2 together and Component 3 separately, rather than each component separately. Preferably, Components 1 and 2 are in liquid form, such as when dissolved in suitable solvents.

This invention presents several improvements to the known state of the art, such as the efficient color reduction of sugar regardless of the variety of sugar-cane used, with less loss of sugar mass, meaning that the industrial yield is better in terms of sugar output. Furthermore, this invention enhances the thermal efficiency of the sugar mill, in addition to requiring extremely low electricity consumption. No equipment needs to be installed for the additional stages in the sugar mill, with only the installation of small dosing lines and dosing pumps required, with this equipment being extremely simple, as is well known to a person skilled in the art.

As already mentioned, the technology addressed by this invention may be applied at any stage of the conventional process, such as in the juice, the syrup or the molasses, which also constitutes an advantage of this invention. However, the application to the syrup going into any of the first through the last evaporators (application can also be directly to the evaporators), and/or the application to the syrup coming out of the last evaporator is preferred. Even more preferred is to add Components 1-3 or 1 and 3 or 2 and 3 to the syrup going into the last evaporator (or to the last evaporator directly), and to also add Component 2 to the syrup coming out of the last evaporator.

This invention may be understood more clearly through the following examples, which illustrate this invention, although without any limitation.

Unless indicated otherwise, in all examples, all the color measurements were done following the ICUMSA methodology. For example, the sugar samples were tested with ICUMSA Method GS9/1/2/3-8 (2005), the syrup, juice, and other liquid intermediates, were measured with ICUMSA Method GS 1/3-7 (2002). The Determination of polarisation, Brix and fibre in cane and bagasse was made with ICUMSA Method GS 5/7-1 (1994). A person skilled in the art would know how to reproduce them and use different ICUMSA methods, if necessary.

EXAMPLES

The following examples are designed to illustrate a particular realization of this invention. However, it must be understood that these examples are merely illustrative, and do not impose any limitations on the scope of the present invention, other than those presented in the appended claims.

Example 1

Effect of the Variation of the Type of Component 3 on Color Reduction Efficiency Example 1 verifies the possibility of using various types of chelating agents as Component 3. This way, syrup samples taken from the input point of the last evaporator (i.e., samples were taken from syrup being transported to the last evaporator) were collected and tested. In this particular case, there were four evaporators, so the samples were taken from the syrup being transported between the third and fourth evaporators in a sugar processing facility. While the testing of the present invention on actual plant runs (i.e., adding Components 1, 2, and/or 3 to the plant) is believed to be more representative than adding Components 1, 2, and/or 3 to samples of syrup having been removed from the plant, the present testing of lab samples shows that different chelating agents behaved similarly in the lab samples and are therefore expected to also behave similarly when added to the plant. The untreated sample consists of raw syrup entering the last evaporator, with no Components added. The amounts of Components 1 and 2 remained constant at 50 ppm for the treated samples while the quantities of the different types of Component 3 varied, as shown in Table 2. At Table 2, the tests were normalized to compare the use of different amounts of Component 3. The use of HEDP resulted in a reduction of color in the syrup ranging from 9% to 16%. The use of DTMP resulted in 2% to 8% color reduction. The use of ATMP resulted in a −1% to 13% color reduction, depending on the amount. The use of EDTA2Na resulted in a 15% to 24% color reduction. The use of EDTA4Na resulted in 5% to 13% color reduction. Thus, as can be seen, the various chelants utilized generally showed reduction of color in the syrup, and are therefore usable in the present invention.

TABLE 2

| PRODUCT 1 (PPM) | PRODUCT 2 (PPM) | | ICUMSA @ 420 NM | % REDUCTION | % REDUCTION (NORMALIZED) |
|---|---|---|---|---|---|
| | | HEDP (PPM) | | | |
| 0 | 0 | 0 | 9396 | | |
| 50 | 50 | 0 | 8442 | 10% | |
| 50 | 50 | 90 | 7655 | 19% | 9% |
| 50 | 50 | 120 | 7231 | 23% | 14% |
| 50 | 50 | 360 | 7128 | 24% | 16% |
| | | DTMP (PPM) | | | |
| 0 | 0 | 0 | 9396 | | |
| 50 | 50 | 0 | 8442 | 10% | |
| 50 | 50 | 90 | 8234 | 12% | 2% |
| 50 | 50 | 120 | 7985 | 15% | 5% |
| 50 | 50 | 360 | 7764 | 17% | 8% |
| | | ATMP (PPM) | | | |
| 0 | 0 | 0 | 7996 | | |
| 50 | 50 | 0 | 6945 | 13% | |
| 50 | 50 | 90 | 6844 | 14% | 1% |
| 50 | 50 | 120 | 7006 | 12% | −1% |
| 50 | 50 | 360 | 6019 | 25% | 13% |
| | | EDTA2NA (PPM) | | | |
| 0 | 0 | 0 | 7996 | | |
| 50 | 50 | 0 | 6945 | 13% | |
| 50 | 50 | 90 | 5909 | 26% | 15% |
| 50 | 50 | 120 | 5657 | 29% | 19% |
| 50 | 50 | 360 | 5307 | 34% | 24% |
| | | EDTA4NA (PPM) | | | |
| 0 | 0 | 0 | 7996 | | |
| 50 | 50 | 0 | 6945 | 13% | |
| 50 | 50 | 90 | 6588 | 18% | 5% |
| 50 | 50 | 120 | 6019 | 25% | 13% |
| 50 | 50 | 360 | 6056 | 24% | 13% |

Example 2

Analysis of the Color Reduction Obtained with the Use of Components 1, 2 and 3 Compared to the Use of Each of the Components Separately or Together In order to verify the need for the presence of the three Components in the process of the present invention, a series of tests were conducted using different combinations of Components 1, 2, and/or 3.

A traditional sugar production process was utilized, and the use of Components 1, 2, and/or 3 was at the input point of the last evaporator (in this case, the fourth evaporator). In this process, three pumps control the addition of Components 1, 2 and 3. In order to observe the effect of adding a second dose of Component 2 to the process, a fourth pump controlled the addition of Component 2 after the outlet of the last evaporator. Component 1 was added at a 50 ppm concentration relative to the syrup into which it was added (input of last evaporator). Component 2 was added at a 50 ppm concentration at application point #1 (input of last evaporator) and at a 50 ppm concentration at application point #2 (after outlet of last evaporator). Component 3 was added at a 180 ppm concentration relative to the input of the last evaporator.

After adding the Components to a continuous production process, transmittance measurements were taken that gave rise to the color outcomes obtained in UI.

Figure 2:
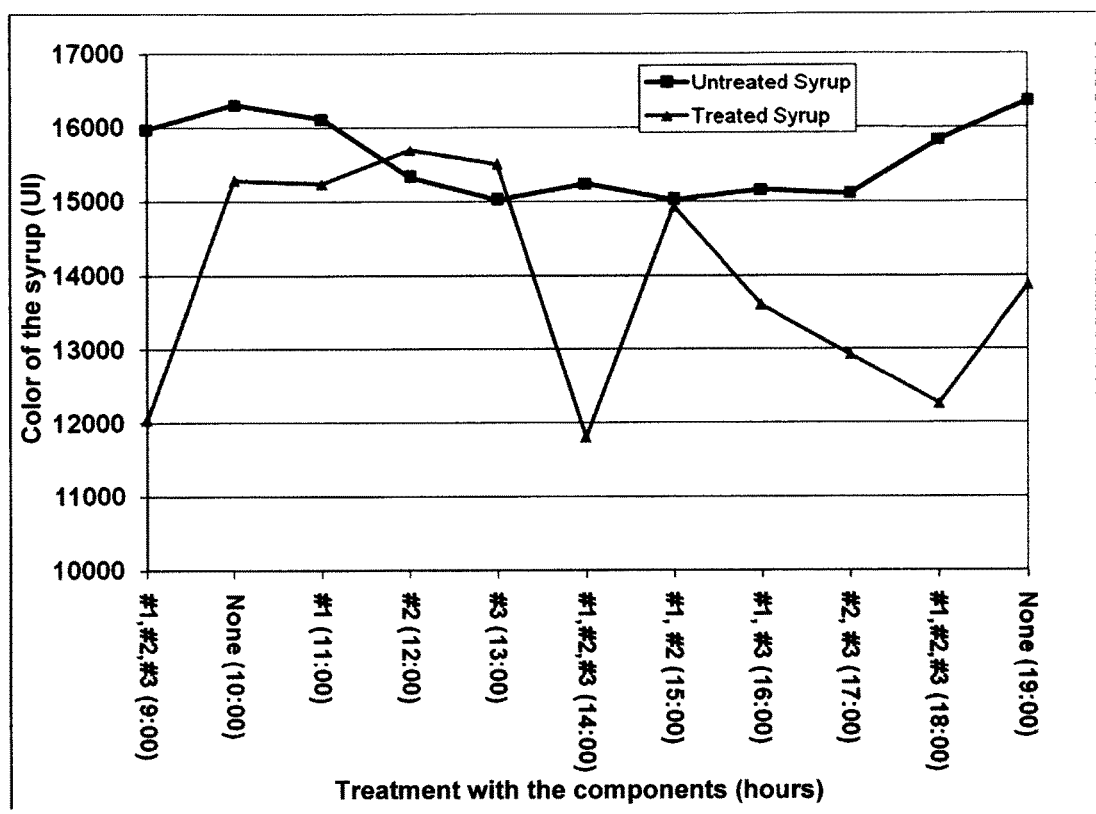
FIG. 2 presents a graph showing the effects of the technology of the present invention for several variations of Components 1, 2 and 3 in sugar processing.

The findings are presented in Table 3 and are graphed in FIG. 2. Basically, untreated syrup was removed before any Components were added to the syrup going to the last evaporator. This is the baseline. Then, Components 1-3 were added to the plant before the last (fourth) evaporator but downstream of where the sample was taken. Component 2 was also added downstream of the last evaporator. Color measurements were taken downstream of the last (fourth) evaporator downstream of the addition of Component 2. The results for the untreated syrup were compared with those of the treated syrup. The reduction in color when all of the pumps were turned off may be attributed to residual Components 1, 2, and 3 still being present from when the pumps for all 3 components were turned on.

As is clear from Table 3 and FIG. 2, Components 1, 2, and 3, when used individually, varied from having essentially no effect, to reducing the color only a small amount. The use of both Components 1 and 2, but no Component 3, also did not result in appreciable reduction in color. The use of Components 1+3 or Components 2+3 resulted in noticeable decrease in color. The use of all three Components resulted in excellent color reduction. Based on the findings presented in Table 3, it is clear that the addition of the three Components together generates a color reduction that is far more marked than that noted when using only one of the Components or a combination of two of the Components. However, the use of Component 3 with any of the other two components also provides acceptable results. These results show that there is an unexpectedly good effect when Component 3 is used with any of the other two components, especially when used in combination with both of the other components.

TABLE 3

| Components | | | PUMP OPERATION | | | Second component 2 application point | Test Blank Color | After treatment | Reduction Achieved |
|---|---|---|---|---|---|---|---|---|---|
| | | | Component 1 | Component 2 | Component 3 | Component 2 | UI | Color UI | |
| 1 | 2 | 3 | On | On | On | On | 15972 | 12040 | 24.6% |
| — | — | — | Off | Off | Off | Off | 16309 | 15282 | 6.3% |
| 1 | | | On | Off | Off | Off | 16115 | 15238 | 5.4% |
| | 2 | | Off | On | Off | On | 15327 | 15691 | −2.4% |
| | | 3 | Off | Off | On | Off | 15019 | 15507 | −3.3% |
| 1 | 2 | 3 | On | On | On | On | 15239 | 11804 | 22.5% |
| 1 | 2 | | On | On | Off | On | 15019 | 14932 | 0.6% |
| 1 | | 3 | On | Off | On | Off | 15150 | 13597 | 10.3% |
| | 2 | 3 | Off | On | On | On | 15106 | 12932 | 14.4% |
| 1 | 2 | 3 | On | On | On | On | 15830 | 12259 | 22.6% |
| — | — | — | Off | Off | Off | Off | 16358 | 13866 | 15.2% |

Example 3

Analysis of the Efficiency of the Present Invention for Color Reduction at Different Stages of the Sugar Production Process In order to verify the applicability of the technology of the present invention during different stages of the traditional sugar production process, the Applicant applied the invention to various samples taken from different locations along the sugar production process.

Consequently, tests were conducted with the raw juice, the decanted juice, the syrup produced by each of the four evaporators used at the mill in question, the rich mother liquor and the poor mother liquor, as well as the VHP liquor and the molasses. Various samples of the above were taken from various locations of the sugar production process, and then were subjected to the procedure below.

The procedure was the following (exemplified only at one of the points, although the same procedure was used at all the others): 5% solutions in mass of Components 1, 2 and 3 were prepared through dissolving 5 g, 15.15 mL and 8.33 mL of Components 1 (purity 100%), 2 (33% aqueous solution) and 3 (60% aqueous solution), respectively, in 100 mL of water.

Then 12 L of syrup was taken from the $3^{rd}$ evaporator in the production process (at a temperature of 90° C.). 500 mL were added into each of several beakers, identified with a test number. The volumes of each Component were added to each beaker as set forth in Table 4, in compliance with the corresponding volumes. Each sample was heated to a boiling point (temperature of more than 100° C.) and was then left to rest for ten minutes. Each sample was transferred to a 500 mL test tube, with the necessary measurements taken to obtain the color values (in UI), as explained above.

The experiments following this protocol were conducted at all the points mentioned above, with the results presented in Table 4 below. Although these laboratory data points are not as reliable as plant data, they are nonetheless useful in an internal comparison to show a similar effect.

| Tests | Component 1 (ppm) | Solution Concentration (%) mL at 5% | Component 2 (ppm) | Solution Concentration (%) mL at 5% | Component 3 (ppm) | Solution Concentration (%) mL at 5% | Color ICUMSA (420 nm) | Color Reduction % |
|---|---|---|---|---|---|---|---|---|
| Raw juice | | | | | | | 13,090 | |
| Raw juice | 50 | 0.5 | 50 | 0.5 | | | 18,601 | −42% |
| Raw juice | 50 | 0.5 | 50 | 0.5 | 90 | 0.9 | 14,720 | −12% |
| Raw juice | 50 | 0.5 | 50 | 0.5 | 120 | 1.2 | 13,932 | −6% |
| Raw juice | 50 | 0.5 | 50 | 0.5 | 360 | 3.6 | 12,040 | 8% |
| Decanted Juice | | | | | | | 6,945 | |
| Decanted Juice | 50 | 0.5 | 50 | 0.5 | | | 6,395 | 8% |
| Decanted Juice | 50 | 0.5 | 50 | 0.5 | 90 | 0.9 | 5,085 | 27% |
| Decanted Juice | 50 | 0.5 | 50 | 0.5 | 120 | 1.2 | 4,836 | 30% |
| Decanted Juice | 50 | 0.5 | 50 | 0.5 | 360 | 3.6 | 3,599 | 48% |
| 1st Evaporator Syrup | | | | | | | 6,785 | |
| 1st Evaporator Syrup | 50 | 0.5 | 50 | 0.5 | | | 6,785 | 0% |
| 1st Evaporator Syrup | 50 | 0.5 | 50 | 0.5 | 90 | 0.9 | 5,358 | 21% |
| 1st Evaporator Syrup | 50 | 0.5 | 50 | 0.5 | 120 | 1.2 | 5,484 | 19% |
| 1st Evaporator Syrup | 50 | 0.5 | 50 | 0.5 | 360 | 3.6 | 4,582 | 32% |
| 2nd Evaporator Syrup | | | | | | | 8,553 | |
| 2nd Evaporator Syrup | 50 | 0.5 | 50 | 0.5 | | | 8,097 | 5% |
| 2nd Evaporator Syrup | 50 | 0.5 | 50 | 0.5 | 90 | 0.9 | 6,224 | 27% |
| 2nd Evaporator Syrup | 50 | 0.5 | 50 | 0.5 | 120 | 1.2 | 6,657 | 22% |
| 2nd Evaporator Syrup | 50 | 0.5 | 50 | 0.5 | 360 | 3.6 | 5,923 | 31% |
| 3rd Evaporator Syrup | | | | | | | 6,577 | |
| 3rd Evaporator Syrup | 50 | 0.5 | 50 | 0.5 | | | 6,400 | 3% |
| 3rd Evaporator Syrup | 50 | 0.5 | 50 | 0.5 | 90 | 0.9 | 5,782 | 12% |
| 3rd Evaporator Syrup | 50 | 0.5 | 50 | 0.5 | 120 | 1.2 | 5,610 | 15% |
| 3rd Evaporator Syrup | 50 | 0.5 | 50 | 0.5 | 360 | 3.6 | 4,968 | 24% |
| 4th Evaporator Syrup | | | | | | | 6,757 | |
| 4th Evaporator Syrup | 50 | 0.5 | 50 | 0.5 | | | 6,420 | 5 % |
| 4th Evaporator Syrup | 50 | 0.5 | 50 | 0.5 | 90 | 0.9 | 5,830 | 14% |
| 4th Evaporator Syrup | 50 | 0.5 | 50 | 0.5 | 120 | 1.2 | 6,112 | 10% |

| Tests | Component 1 (ppm) | Solution Concentration (%) mL at 5% | Component 2 (ppm) | Solution Concentration (%) mL at 5% | Component 3 (ppm) | Solution Concentration (%) mL at 5% | Color ICUMSA (420 nm) | Color Reduction % |
|---|---|---|---|---|---|---|---|---|
| 4th Evaporator Syrup | 50 | 0.5 | 50 | 0.5 | 360 | 3.6 | 5,502 | 19% |
| Rich mother liquor | | | | | | | 9,016 | |
| Rich mother liquor | 50 | 0.5 | 50 | 0.5 | | | 9,041 | 0% |
| Rich mother liquor | 50 | 0.5 | 50 | 0.5 | 90 | 0.9 | 9,118 | −1% |
| Rich mother liquor | 50 | 0.5 | 50 | 0.5 | 120 | 1.2 | 9,770 | −8% |
| Rich mother liquor | 50 | 0.5 | 50 | 0.5 | 360 | 3.6 | 7,688 | 15% |
| Poor mother liquor | | | | | | | 12,409 | |
| Poor mother liquor | 50 | 0.5 | 50 | 0.5 | | | 11,974 | 4% |
| Poor mother liquor | 50 | 0.5 | 50 | 0.5 | 90 | 0.9 | 10,883 | 12% |
| Poor mother liquor | 50 | 0.5 | 50 | 0.5 | 120 | 1.2 | 9,716 | 22% |
| Poor mother liquor | 50 | 0.5 | 50 | 0.5 | 360 | 3.6 | 8,317 | 33% |
| VHP liquor | | | | | | | 828 | |
| VHP liquor | 50 | 0.5 | 50 | 0.5 | | | 851 | −3% |
| VHP liquor | 50 | 0.5 | 50 | 0.5 | 90 | 0.9 | 613 | 26% |
| VHP liquor | 50 | 0.5 | 50 | 0.5 | 120 | 1.2 | 526 | 36% |
| VHP liquor | 50 | 0.5 | 50 | 0.5 | 360 | 3.6 | 548 | 34% |
| Molasses | | | | | | | 21,657 | |
| Molasses | 50 | 0.5 | 50 | 0.5 | | | 23,031 | −6% |
| Molasses | 50 | 0.5 | 50 | 0.5 | 90 | 0.9 | 23,390 | −8% |
| Molasses | 50 | 0.5 | 50 | 0.5 | 120 | 1.2 | 24,246 | −12% |
| Molasses | 50 | 0.5 | 50 | 0.5 | 360 | 3.6 | 26,057 | −20% |

As can be noted from Table 4 above, the technology of the present invention, as applied consistently to different liquids from a sugar processing process, as able to reduce the color of the liquid.

Figure 5:
FIG. 5 shows the application of the technology of the present invention on molasses.

It is important to note that in applying this method to molasses, it appears in Table 4 that the colors increased as the quantities of Component 3 increased. This was likely due to the fact that molasses is a very viscous liquid and with the addition of the Components of the present invention, the turbidity of the solution increased greatly, resulting in the color measurements giving high readings (as they are based on the solution transmittance). However, there is a visual reduction in color, as shown in FIG. 5.

Example 4

Tests were conducted at various points along the traditional sugar production process in order to verify the efficacy of the technology at different stages of this production process. The procedure was the same as in Example 3, except that the concentration of Components 1, 2, and 3 were 100 ppm, 100 ppm, and 360 ppm, respectively. Once again, these data points are comparable to themselves and not necessarily comparable to data from plant testing. However, all of the data points below, which were taken at different points of the sugar processing process except for molasses, show a color improvement. The results are presented in Table 5, below:

TABLE 5

| | Test Blank COLOR UI | Dosed COLOR UI | Color Reductions % |
|---|---|---|---|
| Raw Juice | 22,634 | 14,215 | 37% |
| Decanted Juice | 7,963 | 4,261 | 46% |
| Outflow Juice from 1st Evaporator | 14,763 | 5,946 | 60% |
| Outflow Juice from 2nd Evaporator | 8,030 | 4,298 | 46% |
| Outflow Juice from 3rd Evaporator | 6,281 | 4,394 | 30% |
| Outflow Juice from 4th Evaporator (syrup) | 6,319 | 4,740 | 25% |

TABLE 5-continued

| | Test Blank COLOR UI | Dosed COLOR UI | Color Reductions % |
|---|---|---|---|
| Rich mother liquor | 8,349 | 8,188 | 2% |
| Poor mother liquor | 14,215 | 12,312 | 13% |
| VHP Sugar (syrup at 45° Brix) | 777 | 504 | 35% |

The values obtained show clearly that the technology of the present invention may be applied at any of the above points of the sugar production process to result in color reduction.

Example 5

Sugar was prepared according to conventional technology and also according to the present invention, to determine the differences. This was raw sugar (i.e., it was not refined). The standard sugar and the sugar made according to the present invention were made in the same plant. None of Components 1, 2, or 3 were used to prepare the standard sugar. Components 1, 2, and 3 were used to prepare the sugar according to the present invention. Specifically, Component 1 was sodium formaldehyde sulfoxylate, Component 2 was sodium metabisulfite, and Component 3 was HEDP. Components 1-3 were applied separately to the syrup entering the fourth (and last) evaporator. Component 2 was additionally applied to the syrup leaving the fourth (and last) evaporator. Components 1-3 were used in the following amounts: Component 1, 50 ppm, Component 2, 50 ppm (application point #1) and 50 ppm (application point #2), and Component #3 was used at 180 ppm.

The preparation of the standard sugar showed an ICUMSA color for the raw sugar of an average of 309 (three samples tested at three different times).

The preparation of the sugar according to the present invention showed an ICUMSA color for the untreated syrup going into the fourth (and last) evaporator of 13012 (average of three tests at different times). Components 1, 2, and 3 were added downstream of the sample taken for testing but before entering the fourth (and last) evaporator. Component 2 was reapplied after the fourth evaporator. Downstream of that application, another sample of syrup was taken for color testing and resulted in a color of 9651 (average of three tests at different times). Thus, the present invention showed a reduction in syrup color of 25.8%. The sugar produced showed a color of 88 (average of three tests taken at three times). The sugar prepared according to the present invention thus showed a color reduction of 71.5% relative to standard sugar.

Example 6

Sugar was made in a different trial. The procedure was the same as in Example 5 above, except that the amounts of Components 1-3 were twice those in Example 5, as follows: Component 1, 100 ppm, Component 2, 100 ppm (application point #1) and 100 ppm (application point #2), and Component 3 was used at 360 ppm. The preparation of the standard sugar showed an ICUMSA color for the raw sugar of an average of 620 (three samples tested at three different times).

The preparation of the sugar according to the present invention showed an ICUMSA color for the untreated syrup going into the fourth (and last evaporator) of 15,870 (average of three tests at different times). Components 1, 2, and 3 were added downstream of the sample taken for testing but before entering the fourth (and last) evaporator. Component 2 was reapplied after the fourth evaporator. Downstream of that application, another sample of syrup was taken for color testing and resulted in a color of 10,910 (average of three tests at different times). Thus, the present invention showed a reduction in syrup color of 31.3%. The sugar produced showed a color of 191 (average of three tests taken at three times). The sugar prepared according to the present invention thus showed a color reduction of 69.2% relative to standard sugar.

Example 7

Sugar was made according to the present invention. The amount of Component 3 was varied to see the effect on the sugar color. The sugar without any of Components 1-3 had a UI of 200. The standard was the syrup obtained before the addition of Components 1-3 before the last (fourth) evaporator. The final syrup is that obtained downstream of the adding of Component 2 after the fourth evaporator. The results are shown in Table 6 below.

TABLE 6

| Product 1 (ppm) | Product 2 (ppm) | Product 3 (ppm) | Standard syrup (UI) | Syrup (Final) ICUMSA UI | Sugar ICUMSA | Syrup color reduction (%) | Sugar Color Reduction (%) |
|---|---|---|---|---|---|---|---|
| 50 | 100 | 60 | 9441 | 8379 | 65 | 11.2 | 67.5 |
| 50 | 100 | 90 | 8577 | 6734 | 90 | 21.5 | 55 |
| 50 | 100 | 120 | 8422 | 6542 | 79 | 22.3 | 60.5 |
| 50 | 100 | 180 | 6054 | 5102 | 40 | 15.7 | 80 |

As shown above, all of the samples of syrup tested and the final sugar, showed significant improvement over the standard when Components 1-3 were utilized.

In the sugar obtained in this example, the amount of residual HEDP of the resulting sugar was, on average, the following: 60 ppm HEDP used (4.4 ppm residual HEDP), 90 ppm HEDP used (32.7 ppm residual HEDP), 120 ppm HEDP used (49.7 ppm residual HEDP, and 180 ppm HEDP used (66.8 ppm residual HEDP), as already mentioned above.

Example 8

The present invention not only results in less color than conventional technology, but also results in greater stability of color over time for the sugar produced. The increase in color for stored sugar may be affected by temperature of the drying of the sugar, the temperature of the environment where the sugar is stored, moisture of the environment, and others. For the present Example, sugar sacks of 50 kgs were prepared with conventional technology and with technology according to the present invention. The sugar made and tested was subjected to the same storage conditions, such as the same type of bags, same temperature of sugar when dried (40 to 42° C.), and same temperature and humidity during storage. The testing was done for six months of stability on two different date ranges, as shown below in Tables 7 and 8, respectively. For producing the sugar according to the present invention in the data shown in Table 7, the chemicals applied were 100 ppm, 100 ppm and 360 ppm of Components 1, 2, and 3, respectively, at the input of the last evaporator, and 100 ppm of Component 2 at the output of the last evaporator. Regarding Table 8, it was the same method, but the chemicals used were 50 ppm, 50 ppm and 60 ppm, of Components 1, 2 and 3, respectively, and 50 ppm of Component 2 in the second input point.

TABLE 7

|  | Sugar Produced According to the Present Invention | Sugar Produced with Conventional Technology |
|---|---|---|
| Initial Color | 138 UI | 340 UI |
| Final Color | 149 UI | 420 UI |
| Increase in Color | 7.97% | 23.53% |

TABLE 8

|  | Sugar Produced According to the Present Invention | Sugar Produced with Conventional Technology |
|---|---|---|
| Initial Color | 112 UI | 238 UI |
| Final Color | 119 UI | 290 UI |
| Increase in Color | 6.25% | 21.85% |

As can be seen above, the present invention also results in significant and unexpected reduction in increase of color for the sugar being stored, demonstrating its advantages in increasing color stability. Components 1 and 3, in particular, contribute to this stability.

Finally, it must be stressed that, as well understood by a person skilled in the art, countless modifications and variations on this invention are possible, based on the teachings presented above, without extending beyond the scope of its protection, as set forth in the appended Claims.

The invention claimed is:

1. A method for reducing the color of sugar or any intermediate of a process for obtaining sugar, consisting of adding to the sugar or any intermediate in a process for obtaining sugar:
   Component 1: a member selected from the group consisting of a sulfoxylate, a salt of the form $M^{+-}O-S(=O)-CH(OH)R$, and a monobasic organic acid of sulfur having the general formula $RSO_2H$; wherein $M^+$ can be a mono or multivalent cation, and wherein R=H, $C_1$-$C_{20}$ alkyl, branched $C_1$-$C_{20}$ alkyl, cyclic $C_5$-$C_6$ alkyl, aryl, benzyl, or heterocyclic $C_5$-$C_6$ rings, and wherein R can be substituted or unsubstituted; or mixtures thereof; and
   Component 2: at least one of a sulfite, a metabisulfite, a bisulfite, or sulfur dioxide, or a source thereof; and
   Component 3: at least one chelating agent;
   wherein Component 2 is added at a temperature between 65° C. and 150° C. and at a pH of greater than 3;
   and wherein Components 1, 2, and 3 are added at the input of an evaporator;
   whereby the color stability of the sugar or any intermediate of a process for obtaining sugar is increased.

2. A method, according to claim 1, which comprises adding Components 1, 2, and 3 to a process for the preparation of syrup, to a process for the preparation of raw sugar from syrup, or to the process for refining of raw sugar into refined sugar.

3. A process for the production of low color sugar or any intermediate of a process for obtaining sugar, which comprises adding:
   Component 1: a member selected from the group consisting of a sulfoxylate, a salt of the form $M^{+-}O-S(=O)-CH(OH)R$, and a monobasic organic acid of sulfur having the general formula $RSO_2H$; wherein $M^+$ can be a mono or multivalent cation, and wherein R=H, $C_1$-$C_{20}$ alkyl, branched $C_1$-$C_{20}$ alkyl, cyclic $C_5$-$C_6$ alkyl, aryl, benzyl, or heterocyclic $C_5$-$C_6$ rings, and wherein R can be substituted or unsubstituted; or mixtures thereof;
   Component 2: at least one of a sulfite, a metabisulfite, a bisulfite, or sulfur dioxide, or a source thereof; and
   Component 3: at least one chelating agent;
   adding Component 2 at a temperature between 65° C. and 150° C. and at a pH of greater than 3;
   and introducing Components 1, 2, and 3 into the process at the input of an evaporator;
   whereby the color stability of the sugar or any intermediate of a process for obtaining sugar is increased.

4. A process, according to claim 3, wherein the raw material for sugar production is a member selected from the group consisting of sugar cane, sugar-beets, saccharine sorghum, or mixtures thereof.

5. A method for reducing the color of sugar or any intermediate of a process for obtaining sugar, consisting of the addition of:
   Component 1: a member selected from the group consisting of one or more of a sulfoxylate, a salt of the form $M^{+-}O-S(=O)-CH(OH)R$, and a monobasic organic acid of sulfur having the general formula $RSO_2H$; wherein $M^+$ can be a mono or multivalent cation, and wherein R=H, $C_1$-$C_{20}$ alkyl, branched $C_1$-$C_{20}$ alkyl, cyclic $C_5$-$C_6$ alkyl, aryl, benzyl, or heterocyclic $C_5$-$C_6$ rings, and wherein R can be substituted or unsubstituted; or mixtures thereof;
   Component 2: at least one of a sulfite, a metabisulfite, a bisulfite, or sulfur dioxide, or a source thereof; and
   Component 3: at least one chelating agent;
   wherein Component 3 is added at the input of an evaporator;
   whereby the color stability of the sugar or any intermediate of a process for obtaining sugar is increased.

* * * * *